US012748837B1

(12) United States Patent
Henriquez Garcia

(10) Patent No.: US 12,748,837 B1
(45) Date of Patent: Sep. 29, 2026

(54) EFFICIENT MONITORING OF MEMORY REGIONS CONTAINING SENSITIVE ARTIFACTS

(71) Applicant: Amazon Technologies, Inc., Seattle, WA (US)

(72) Inventor: Rene Ernesto Henriquez Garcia, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 1129 days.

(21) Appl. No.: 16/699,361

(22) Filed: Nov. 29, 2019

(51) Int. Cl.
*G06F 21/55* (2013.01)
*G06N 20/00* (2019.01)

(52) U.S. Cl.
CPC ........... *G06F 21/554* (2013.01); *G06N 20/00* (2019.01); *G06F 2221/034* (2013.01)

(58) Field of Classification Search
CPC .. G06F 21/554; G06F 2221/034; G06N 20/00
USPC ............................................................ 726/23
See application file for complete search history.

(56) References Cited

U.S. PATENT DOCUMENTS

| | | | | |
|---|---|---|---|---|
| 5,301,278 | A | 4/1994 | Bowater et al. | |
| 6,334,174 | B1 | 12/2001 | Delp et al. | |
| 7,024,514 | B2 | 4/2006 | Mukaida et al. | |
| 7,240,145 | B2 | 7/2007 | Holman | |
| 7,532,537 | B2 | 5/2009 | Solomon et al. | |
| 8,041,884 | B2 | 10/2011 | Chang | |
| 8,341,333 | B2 | 12/2012 | Takada | |
| 8,615,679 | B2 | 12/2013 | Smith et al. | |
| 11,080,397 | B2 * | 8/2021 | Rinaldi | G06F 21/566 |
| 2013/0312098 | A1 * | 11/2013 | Kapoor | G06F 21/554 726/24 |
| 2020/0151324 | A1 * | 5/2020 | Walker | G06F 21/6218 |
| 2020/0201782 | A1 * | 6/2020 | Tsao | G06F 12/124 |
| 2020/0285498 | A1 * | 9/2020 | Keeth | G06F 21/6218 |
| 2021/0089459 | A1 * | 3/2021 | Lu | G06F 12/0811 |
| 2021/0294895 | A1 * | 9/2021 | Lee | G06F 21/568 |
| 2021/0406177 | A1 * | 12/2021 | Patel | G06F 12/082 |
| 2022/0019656 | A1 * | 1/2022 | Wurster | G06F 21/52 |
| 2022/0237290 | A1 * | 7/2022 | Villegas | G06F 12/14 |

* cited by examiner

*Primary Examiner* — Dereena T Cattungal
(74) *Attorney, Agent, or Firm* — Robert C. Kowert; Kowert, Hood, Munyon, Rankin & Goetzel, P.C.

(57) ABSTRACT

A device comprises memory monitor circuitry configured to access one or more sensitive region descriptors to detect that a security rule applies to a target memory location of a memory access requested from a compute engine. The memory monitor circuitry determines that one or more mitigation operations associated with the security rule are to be performed, and initiates the mitigation operations.

19 Claims, 10 Drawing Sheets

EFFICIENT MONITORING OF MEMORY REGIONS CONTAINING SENSITIVE ARTIFACTS

BACKGROUND

Ensuring the trustworthiness and security of the hosts and data being used to run computer-based applications has become a growing concern in recent years, as the sophistication of attack mechanisms has increased. Hardware and software engineers keep enhancing the built-in safety mechanisms of computer systems, while attackers keep discovering new avenues for penetrating the defenses designed by the engineers. Further complicating the security problem, more and more computer-based applications are being run on network-accessible resources that can be shared among multiple users, which can potentially provide additional opportunities for various types of security breaches. Many companies and other organizations operate computer networks that interconnect numerous computing systems to support their operations, such as with the computing systems being located in multiple distinct geographical locations (e.g., connected via one or more intermediate networks). Data centers housing significant numbers of interconnected computing systems have become commonplace, including public data centers that are operated by entities as businesses to provide computing resources to customers. Some public data center operators provide network access, power, and secure installation facilities for hardware owned by various customers, while other public data center operators provide "full service" facilities that also include hardware resources made available for use by multiple customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization host to be shared among multiple users by providing each user with one or more "guest" virtual machines (also known as compute instances) hosted by the single virtualization host. Each such compute instance may represent a software simulation acting as a distinct logical computing system that provides users with the illusion that they are the sole operators of a given hardware computing resource, while also providing application isolation and security among the various compute instances. Instantiating several different compute instances on the same host may also help increase the overall hardware utilization levels at a data center, leading to higher returns on investment. However, such virtualization-based sharing of resources may also allow programs from a variety of sources to be run at a given host, potentially increasing the probability of attempts to breach security. Both virtualized and non-virtualized computing systems include low-level layers of software and/or firmware which are often transparent to the users of the system, and may be utilized on behalf of multiple users over time. Detection of security attacks directed to such layers may represent a non-trivial technical problem.

Figure 1:
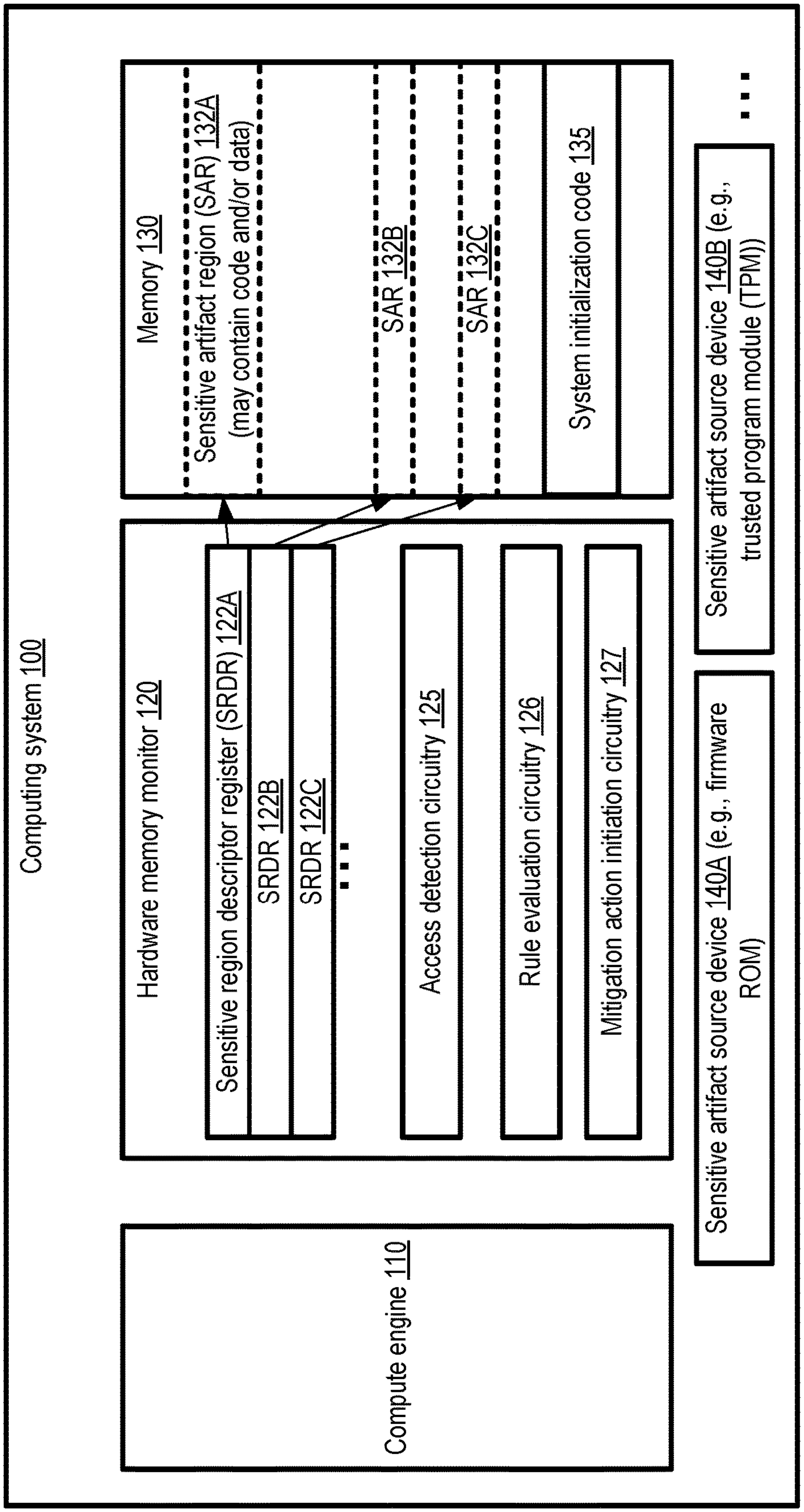
FIG. 1 illustrates an example system environment in which hardware memory monitors may be used to efficiently detect and respond to accesses directed to memory regions comprising sensitive artifacts, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for efficient monitoring, using low-level hardware devices, of accesses to memory regions which may store security-sensitive artifacts (such as firmware, security keys, and the like) at computer systems. The techniques described herein may be implemented at a wide variety of computing systems, including for example servers used to host compute instances of a virtualized computing service of a provider network or cloud computing environment, hosts at which virtualization is not implemented, small-footprint devices such as sensors, wearable devices, Internet-of-things (IoT) devices, and the like in different embodiments. In at least some embodiments, at a high-level, at least the following types of tasks related to the monitoring of memory may be performed at a computer system: (a) populating, for example during a system boot/initialization phase, a set of sensitive region descriptors (such as hardware registers) with the address ranges and/or other information about the regions of memory containing security-sensitive artifacts, (b) detecting, using the descriptors and logic implemented in the circuitry of the memory monitor, accesses directed to such a region, (c) determining, at the memory monitor, whether a given access requires one or more mitigation operations (e.g., if the access represents a violation of a security rule pertaining to the targeted memory region) and (d) initiating, by the memory monitor, any required mitigation operations (such as blocking/aborting the access).

In some embodiments, a hardware memory monitor may be incorporated within a memory controller which receives memory access requests from a compute engine (such as a CPU or a graphics processing unit (GPU)) and performs the requested read or write operations. Such hardware memory monitors (MMs) may be referred to as "in-line", "in-controller" or "in-band" MMs in at least some embodiments. In other embodiments, "side-band" or "out-of-controller" MMs may be employed, which are not part of the path between the compute engine and the memory. MMs may monitor accesses requested from CPUs, GPUs, system management processors (such as baseboard management controllers (BMCs)) which are attached to motherboards, processors implemented at systems-on-chip (SOCs) on offloading cards connected to the primary CPUs via peripheral interconnects such as PCI (Peripheral Components Interconnect) or PCIe (PCI-express) buses, and so on. The kinds of MMs described herein are not limited to monitoring accesses from processors supporting any particular instruction set architecture (ISA) or any specific category of memory; as such, the described memory monitoring techniques may be implemented at a wide range of computing devices, from high-performance servers to lightweight sensors and IoT devices.

As one skilled in the art will appreciate in light of this disclosure, certain embodiments may be capable of achieving various advantages, including some or all of the following: (a) substantially reducing the time taken to detect potential security breaches at computer systems, without imposing perceptible performance penalties on the applications being run, (b) substantially reducing the time taken to implement mitigations of potential security breaches, e.g., by rejecting requests for undesired memory accesses before the targeted memory is actually accessed, by shutting down systems under attack, etc. and (c) improving the user experience of administrators or other users responsible for computer system security, e.g., by providing clear and concise views of protected memory regions, statistics regarding accesses to such regions and so on.

According to one embodiment, a system may comprise one or more compute engines (e.g., CPUs, GPUs and the like), one or more memories, and a hardware memory monitor device. The one or more memories may comprise executable instructions that when executed on or across the one or more compute engines store information into one or more sensitive region descriptors about one or more regions of memory which contain sensitive artifacts (e.g., code and/or data) and have associated security rules. In at least some embodiments, individual ones of the sensitive region descriptors may comprise respective registers of a group of hardware registers which are part of, or accessible from, the hardware memory monitor. The sensitive region descriptors may be populated early on during the boot or initialization phase of the system in some embodiments, e.g., as part of the work done during a secure boot procedure. In some embodiments, once the data about the sensitive memory regions has been stored, the descriptors may remain un-modifiable until the next restart or reboot of the system. Any combination of various types of information about the sensitive regions may be stored at such registers in different embodiments, such as the start and/or end addresses/locations of the regions, encodings of the kinds of security rules which apply to a given region (e.g., whether a region is designated read-only, read-write, etc. for one or more privilege levels), and/or encodings of the types or sequence of mitigation operations to be triggered in response to a memory access to which the security rule applies. In other embodiments, representations of the security rules and/or the mitigation actions may be stored elsewhere (i.e., not within the sensitive region descriptors which indicate the start and end locations of the sensitive artifact regions). In at least one embodiment, a default (e.g., system-defined) security rule (e.g., the equivalent of "no writes are allowed") and/or a default mitigation action (e.g., the equivalent of "abort/block the memory access") may be used for at least some sensitive artifact regions, and so there may be no need to store indications of the security rules or mitigation actions. Note that the term "write" as used with respect to sensitive artifacts or regions may refer to any type of modifying operation in various embodiments, including updates/overwrites, deletions, or additions/extensions.

In various embodiments, the memory monitor device may comprise circuitry configured to detect that a target memory location of a memory access requested from a compute engine is part of a particular region indicated in the one or more sensitive region descriptors, and that as a result, a security rule applicable to the memory access is to be evaluated. In some cases, the targeted region may comprise one or more elements of firmware to which at least one security rule applies; in other cases, the targeted region may for example other types of artifacts to which security rules apply, such as software code of an application, cryptographic keys or other security artifacts, and so on. In x86 based systems, one example of the kinds of security-sensitive artifacts protected using a hardware memory monitor may include the low-level code that is run in system management mode (SMM). In ARM-based systems, example artifacts protected using the hardware memory monitor may include Arm Trusted Firmware (ATF) such as EL3 (Exception Level 3) monitor firmware, as well as handler tables.

Based for example of the type of memory access that was requested (e.g., read or write) and/or the applicable security rules, the memory monitor circuitry may detect that the memory access violates one or more of the security rules, and may initiate one or more mitigation actions applicable to such violations in at least some embodiments. In at least some embodiments, a security rule may not necessarily have to be violated for the rule to trigger one or more mitigation actions—for example, a rule may simply require that a notification indicating a memory access be generated and transmitted to one or more destinations, even if the memory access itself is allowed. Note that in some cases, an access to a region of memory containing security-sensitive artifacts may not necessarily be malicious or even intentional; instead, such an access may result from a software/firmware bug (e.g., in low-level interrupt handlers of firmware services which may be invoked from an operating system). In various embodiments, hardware memory monitors may identify and mitigate accesses to memory regions containing sensitive artifacts regardless of whether the accesses were part of an attack, or were a result of a bug and hence may have been unintentional.

In some embodiments, users or clients of a service at which such hardware memory monitoring is implemented may provide preferences and/or guidelines regarding various aspects of the monitoring to be performed. For example, a computing service of a provider network or cloud computing environment whose servers contain hardware memory monitors may implement one or more types of programmatic interfaces, such as a web-based console, a set of application programming interfaces, command-line tools, graphical user interfaces and the like which may be used by clients to submit requests pertaining to memory monitoring, and to receive corresponding responses. In one embodiment, a client may submit an indication of the set of artifacts which are to be protected using the hardware memory monitor, an indication of a particular memory region which is to be protected, definitions of and details about the specific security rules to be applied to one or more memory regions, and so on. In at least one embodiment, a client may provide an indication of the specific types of mitigation actions to be undertaken in view of a particular security rule applicable to one or more memory regions. In some embodiments, clients may submit configuration files (e.g., files formatted in Extensible Markup Language (XML), Javascript Object Notation (JSON), and/or other markup or programming languages) containing the client's preferences and/or guidelines via the programmatic interfaces. Based on the programmatic input provided by the client, in some embodiments the code to be executed during the initialization phase at the computing systems may be generated at the computing service of the provider network, and deployed to the computing systems to be used by the client. Similarly, code to implement the client-indicated mitigation actions may be generated and deployed at the appropriate computer systems from the service in at least some embodiments. In one embodiment, one or more of the security rules and/or mitigation actions may be generated automatically by such a computing service.

Hosts comprising hardware memory monitoring devices of the kind introduced above may be used in some embodiments to implement a suite of services of a cloud provider network (sometimes simply called a "cloud"), which refers to a large pool of network-accessible computing resources (such as compute, storage, and networking resources, applications, and services), which may be virtualized or bare-metal. Bare-metal compute instances, supported at some provider network computing services, may allow direct access to some hardware devices, e.g., without using an intermediary hypervisor or other virtualization management layers which may typically prevent some types of accesses. In some embodiments, at least some servers used for bare-metal compute instances of a cloud may include hardware memory monitoring devices. The cloud can provide convenient, on-demand network access to a shared pool of configurable computing resources that can be programmatically provisioned and released in response to customer commands. These resources can be dynamically provisioned and reconfigured to adjust to variable load. The resources of a provider network may in some cases be distributed across multiple data centers, which in turn may be distributed among numerous geographical regions (e.g., with each region corresponding to one or more cities, states or countries). For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network). In other embodiments, hosts or servers which use the described hardware memory monitors may not be used for the services of a provider network; instead, for example, they may be used at any premise or data center.

According to at least some embodiments, the regions of memory whose access are to be monitored may change in size or location over time. For example, at time T1 (e.g., shortly after the initialization of the computer system comprising a hardware memory monitoring device), memory regions MR1 and MR2, starting at locations L1 and L2 respectively, with and respective sizes S1 and S2, may have been designated as requiring access monitoring based on one or more security rules. At time T2, before the computing system is restarted next, an additional section of memory MR3 at location L3 (e.g., comprising one or more newly-generated cryptographic keys) may be designated as requiring access monitoring, or the sizes of MR1 or MR2 may increase or decrease based on results of one or more operations performed at the computing system. In some embodiments, a client on whose behalf the memory regions are being monitored may indicate such changes programmatically to the computing system, and the changes may be propagated to the descriptors/registers storing information about the memory regions after they are obtained at the computing system. In other embodiments, the computing system may comprise programs that are able to detect/determine such changes automatically. In at least one embodiment, for example, a machine learning model and/or a knowledge base, maintained at a computing service may detect such changes without direct input from clients, and generate the contents of descriptors or registers to configure hardware memory monitoring. For example, based on automated analysis of the artifacts or memory regions for which rule-based monitoring has been enabled by numerous clients of a computing service over some period of time, one or more machine learning models may be trained to identify the kinds of artifacts that typically benefit from hardware memory monitoring, automatically detect memory regions in which such artifacts are stored, generate security rules and mitigation operations for the memory regions, and populate sensitive memory region descriptors/registers accordingly at one or more computing systems.

Example System Environment

FIG. 1 illustrates an example system environment in which hardware memory monitors may be used to efficiently detect and respond to accesses directed to memory regions comprising sensitive artifacts, according to at least some embodiments. As shown, computing system 100 comprises at least one compute engine 110 (e.g., a CPU, GPU or other processor) and one or more memories 130. The computing system 100 also includes a hardware memory monitor device 120, as well as one or more sensitive artifact source devices 140 (e.g., devices 140A and 140B) in the depicted embodiment. For example, sensitive artifact source device 140A may include a read only memory (ROM) device at which firmware is stored by a manufacturer or distributor of the computing system in the depicted embodiment, and the firmware may be copied from the device 140A into one or more regions of memory 130 during an initialization phase of the computing system. Sensitive artifact source device 140B may, for example, comprise a security module similar to a trusted program module or TPM, from which one or more cryptographic keys or other artifacts may be copied into memory regions as well in the depicted embodiment.

System initialization code 135 may be stored within the memory 130 and executed at the compute engine after the system 100 is powered on and/or restarted in the depicted embodiment. During the initialization phase of the computing system, one or more sensitive artifacts (such as firmware from source device 140A, cryptographic keys or other security artifacts from source device 140B, application code identified as security-sensitive by a user, and so on) may be loaded into respective regions of memory 130 referred to as sensitive artifact regions (SARs) 132 in the depicted embodiment, e.g., as a result of the execution of node 135. Individual ones of the SARs 132 may comprise some combination of code (e.g., firmware or software code) and/or data in various embodiments. In at least one embodiment, at least a portion of the system initialization code may first be executed directly from or by a sensitive artifact source device 140, and as part of such execution additional system initialization code may be shadowed or copied into memory 130 for further stages of the system's initialization.

The hardware memory monitor 120 may comprise a set of sensitive region descriptor registers (SRDRs) 122 in the depicted embodiment. The SRDRs 122 may each be used to store various types of information about one or more of the SARs in the depicted embodiment. For example, the system initialization code 135 may store the start and end locations or addresses of SARs 132 in SRDRs 122—e.g., the start and end locations of SAR 132A may be stored in register 122A, the start and end locations of SAR 132B may be stored in register 122B, and the start and end locations of SAR 132C may be stored in SRDR 122C. In at least some embodiments, in addition to the start and end locations, encodings or representations of one or more security rules to be applied using the hardware memory monitor 120 may also be stored in the SRDRs 122—e.g., representations of the security rule(s) for SAR 132A may be stored in SRDR 122A, representations of the security rules for SAR 132B may be stored in SRDR 122B, and so on. Similarly, in one embodiment, an indication of the respective mitigation actions to be triggered based on the security rules applicable to memory accesses that target the SARs may also be stored in the SRDRs 122. In other embodiments, representations of the rules and/or the mitigation actions may be stored in other locations accessible from the hardware memory monitor. In some embodiments, instead of storing the end locations of the SARs, the SRDRs may indicate a respective start location and a size of each of the SARs.

In some embodiments, the contents of the SRDRs 122 may not be modifiable after the initialization procedure of the computing system is terminated, and the SRDRs 122 may be modified only after the system 100 is restarted or rebooted (which would again result in the execution of the initialization procedure). For example, a particular privilege level which is granted to system initialization code 135, and not granted to the operating system or application code which start running after the initialization phase, may be required to modify the contents of the SRDRs in one implementation. In other embodiments, at least a subset of the SRDRs 122 may be modifiable after the initialization phase. In some such embodiments, such post-initialization modifications may only be permitted from privileged code or entities, which may in turn be specified/selected by a manufacturer, system integrator or owner of the computing system 100.

The hardware memory monitor 120 may comprise access detection circuitry 125 in the depicted embodiment, which determines whether a given memory access request from the compute engine 110 is directed to an SAR 132 indicated in one or more of the SRDRs 122. The hardware memory monitor 120 may further comprise rule evaluation circuitry 126 which determines, for example, whether a particular memory access directed to an SAR 132 represents a violation of a security rule associated with that SAR 132. For example, if the security rule indicates that an SAR is designated as read-only, and a memory access is a write to a portion of the SAR, this would constitute a rule violation detectable by circuitry 126. The hardware memory monitor 120 may also include mitigation action initiation circuitry 127 which causes one or more mitigation operations triggered by a rule designated for a SAR in the depicted embodiment. To initiate the mitigation action/operation, in some embodiments the equivalent of an interrupt may be generated, causing the compute engine 110 to throw an execution or error and/or execute mitigation code (not shown in FIG. 1) stored within the memory 130. Note that at least in some embodiments, a security rule may not necessarily have to be violated for a mitigation action to be triggered; for example, some rules may simply require reporting or notifications of requested accesses to a particular SAR.

Although the respective circuitries for access detection, rule evaluation and mitigation action initiation are shown as separate elements in FIG. 1, some combination or all of these functions may be combined within common circuitry in at least one embodiment. In some embodiments, a computing system may comprise several different hardware memory monitors 120, e.g., one for each of several different memories accessible from a given compute engine. In some embodiments, a computing system may comprise multiple compute engines, each configured to access one or more memories, and a respective hardware memory monitor may be used for each (compute engine, memory) pair of the system. In one embodiment, the system initialization code executed at one compute engine may populate the SRDRs of a hardware memory monitor configured to detect memory accesses requested from a different compute engine—that is, the compute engine whose memory accesses are monitored by a given hardware memory monitor may differ from the compute engine used to populate the SRDRs used by that hardware memory monitor. In at least one embodiment, one or more SRDRs 122 may be populated or modified after the operating system(s) used at computing system are brought up and/or after user-mode applications have started running.

Example Timeline

Figure 2:
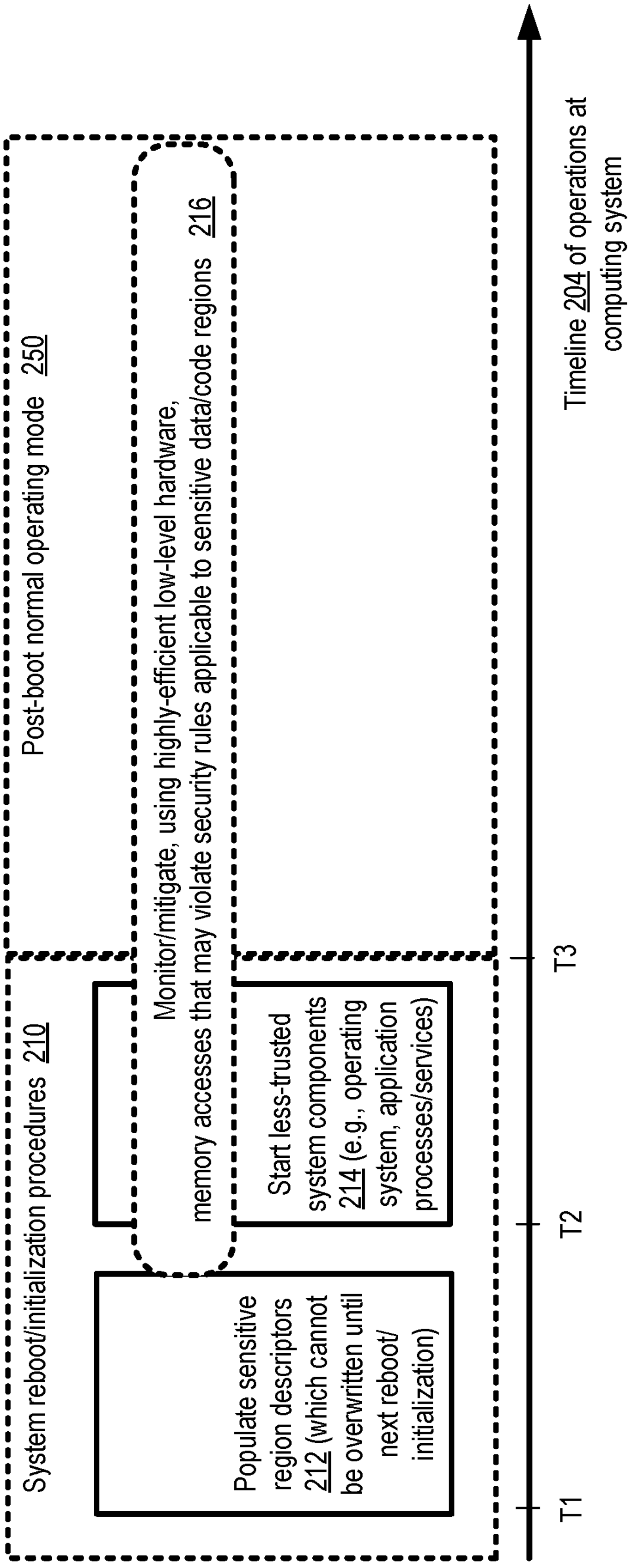
FIG. 2 illustrates an example timeline of operations of a computing system at which hardware memory monitoring is implemented, according to at least some embodiments.

FIG. 2 illustrates an example timeline of operations of a computing system at which hardware memory monitoring is implemented, according to at least some embodiments. System reboot or initialization procedures 210 may be initiated at approximately time T1 along a timeline 204 of operations performed at a computing system in the depicted embodiment. Early in the initialization procedures, a set of sensitive artifacts may be loaded into main memory, and one or more sensitive region descriptors 212 (accessible from one or more hardware memory monitors similar in functionality to monitor 120 of FIG. 1) may be populated with information indicating the locations or addresses of the regions containing the sensitive artifacts, e.g., between time T1 and T2. In at least some embodiments, security credentials required to modify the sensitive region descriptors may only be granted to a subset of highly trusted initialization firmware/software run early during the initialization. As a result, after this early phase of the initialization procedures is completed, the sensitive region descriptors may not be modifiable in such embodiments until the next reboot or restart of the computing system, which would trigger the next round of initialization procedures. In some implementations, the sensitive regions descriptors may be populated during the execution of one or more boot loaders. Depending on the type of computing system being used, multiple-stage boot loaders may be employed in some embodiments, during which several programs of increasing complexity load one another in a process referred to as chain loading, and sensitive region descriptors may be populated early on in the chain. In one embodiment, the sensitive region descriptors may be populated with information about the regions of memory in which sensitive code or data is stored as soon as each of the sensitive artifacts is stored into memory—e.g., as soon as a first set of artifacts requiring access monitoring is stored into region R1 of memory, a sensitive artifact descriptor register Reg1 may be updated to indicate the location of region R1, and then when a second set of artifacts requiring access monitoring is stored into region R2 of memory, another sensitive artifact descriptor register Reg2 may be updated to indicate the location of region R2, and so on. In other embodiments, all the sensitive artifacts for which access monitoring is desired may first be loaded into memory, and then all the sensitive region descriptors may be populated with the appropriate information. In at least one embodiment, clients of a service at which hardware memory monitoring is to be implemented may provide configuration information programmatically, describing or listing the artifacts to be protected using the hardware memory monitors, e.g., in the form of a JSON (JavaScript Object Notation) file or in some other format, and the initialization code of the computing system may utilize such configuration information to populate the sensitive region descriptors.

In the embodiment depicted in FIG. 2, one or more hardware memory monitors of the kind discussed above may begin monitoring memory accesses to detect potential security rule violations as soon as the sensitive region descriptors have been populated with information about the portions of memory comprising security-sensitive artifacts, e.g., shortly before or at time T2 along timeline 204, as indicated in element 216. Less-trusted components of the system, such as one or more components of an operating system and/or application processes/services may be started at approximately time T2 in the scenario shown in FIG. 2, also as part of the initialization procedures 210. After the initialization procedures are completed at time T3, a post-boot normal operating mode 250 may begin, during which various applications may be run at the computing system. The hardware memory monitor(s) may continue to check for, and initiate mitigating operations for, memory accesses which may violate security rules applicable to sensitive data or code regions during the normal operating mode 250 in the depicted embodiment.

In at least one embodiment, as mentioned earlier, information about regions of memory containing sensitive artifacts may be updated after the initialization procedures 210 end. In some such embodiments, changes to sensitive region descriptors may require a high level of administrative privilege supported at the computing system. In one embodiment, write-once log records indicating the details of writes to the sensitive region descriptors (e.g., the contents of the data stored into the descriptors, the times at which such data was stored, and the programs/users which requested the writes) may be generated and stored, e.g., at a secure storage device or service, so that it becomes possible to audit the configuration operations controlling the memory monitor.

Example Compute Engines

Figure 3:
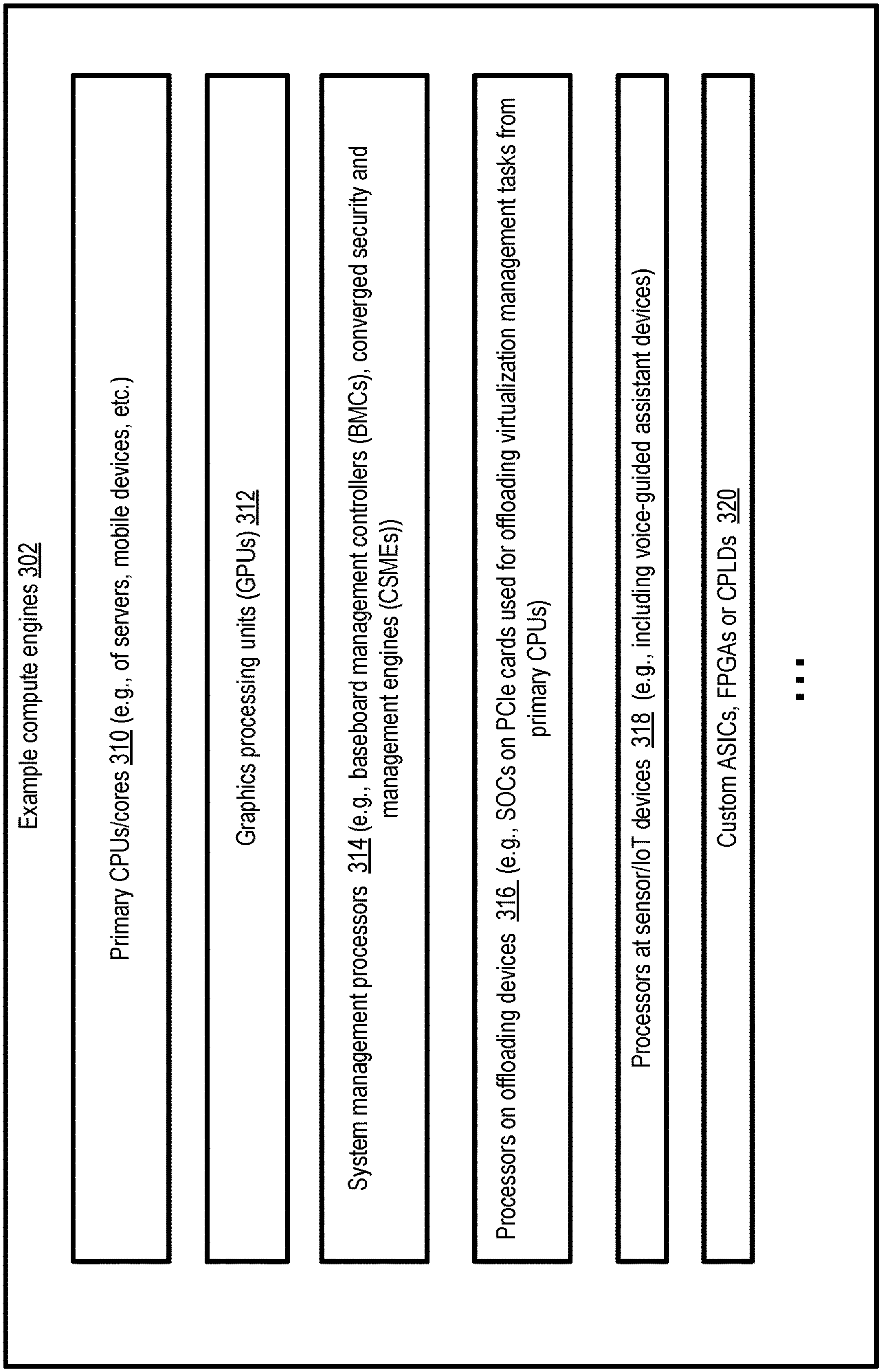
FIG. 3 illustrates examples of compute engines whose requested memory accesses may be monitored, according to at least some embodiments.

FIG. 3 illustrates examples of compute engines whose requested memory accesses may be monitored, according to at least some embodiments. As shown, example compute engines 302 may include primary CPUs or cores 310 of a server or host in various embodiments. For example, primary CPUs or cores of servers used at multi-tenant computing services at a cloud provider network may be used to run compute instances on behalf of multiple users, and enabling enhanced memory access monitoring may be especially useful in such multi-tenant environments. In addition, in at least some embodiments, memory accesses originating at the CPUs/cores used within mobile devices including smart phones and the like may also be monitored for possible security rule violations.

In some environments, graphics processing units (GPUs) 312 may be used for some types of applications, including artificial intelligence or machine learning applications as well as graphics applications, and memory accesses originating at the GPUs may also be monitored using hardware devices similar to those depicted in FIG. 1.

Many commonly-used servers or hosts may include other types of processors, which may be used for tasks such as systems management operations and not for the applications or operating systems run using the primary CPUs and/or GPUs. In at least some embodiments, memory accesses originating at such system management processors 314 may also be monitored using hardware monitors of the kind discussed in the context of FIG. 1. Examples of systems management processors include baseboard management controllers (BMCs), converged security and management engines (CSMEs), and so on.

According to some embodiments, at least a subset of the virtualization hosts at which compute instances (e.g., guest virtual machines) are set up at a virtualized computing service of a provider network may be equipped with virtualization management offloading cards (VMOCs). As indicated by their name, such cards may be used to perform some virtualization management tasks which would otherwise have to be performed at the primary CPUs or cores of the hosts, thereby enabling more of the computing capacity of the primary CPUs to be devoted to running compute instances. VMOCs may be linked to the primary CPUs or cores of the hosts using a peripheral bus or interconnect, such as a PCI or PCIe bus in some embodiments. A given VMOC may comprise, for example, one or more systems-on-chip (SOCs), each comprising a compute engine and one or more memories. In at least one embodiment, hardware memory monitors similar to monitor 120 of FIG. 1 may be incorporated within such offloading devices 316; as such, the accesses to the memories on the offloading devices from the processors on the offloading devices may be monitored.

In recent years, voice-guided assistant devices, smart home appliances and the like have become increasingly popular. Such devices are collectively referred to as "Internet-of-things" or IoT devices. Processors incorporated within such IoT devices 318 or at other types of sensor devices may also represent examples of compute engines 302 whose memory accesses are monitored using hardware memory monitors in at least some embodiments. In some embodiments, hardware memory monitoring may be used for memory access requests generated by custom ASICs (application specific integrated circuits), FPGAs (field programmable gate arrays), and/or CPLDs (complex programmable logic devices) incorporated within various types of computing systems, as indicated in element 320. Hardware memory monitors may also or instead be employed for compute engines other than those shown in FIG. 3 in at least some embodiments.

Example in-Controller Memory Monitor

Figure 4:
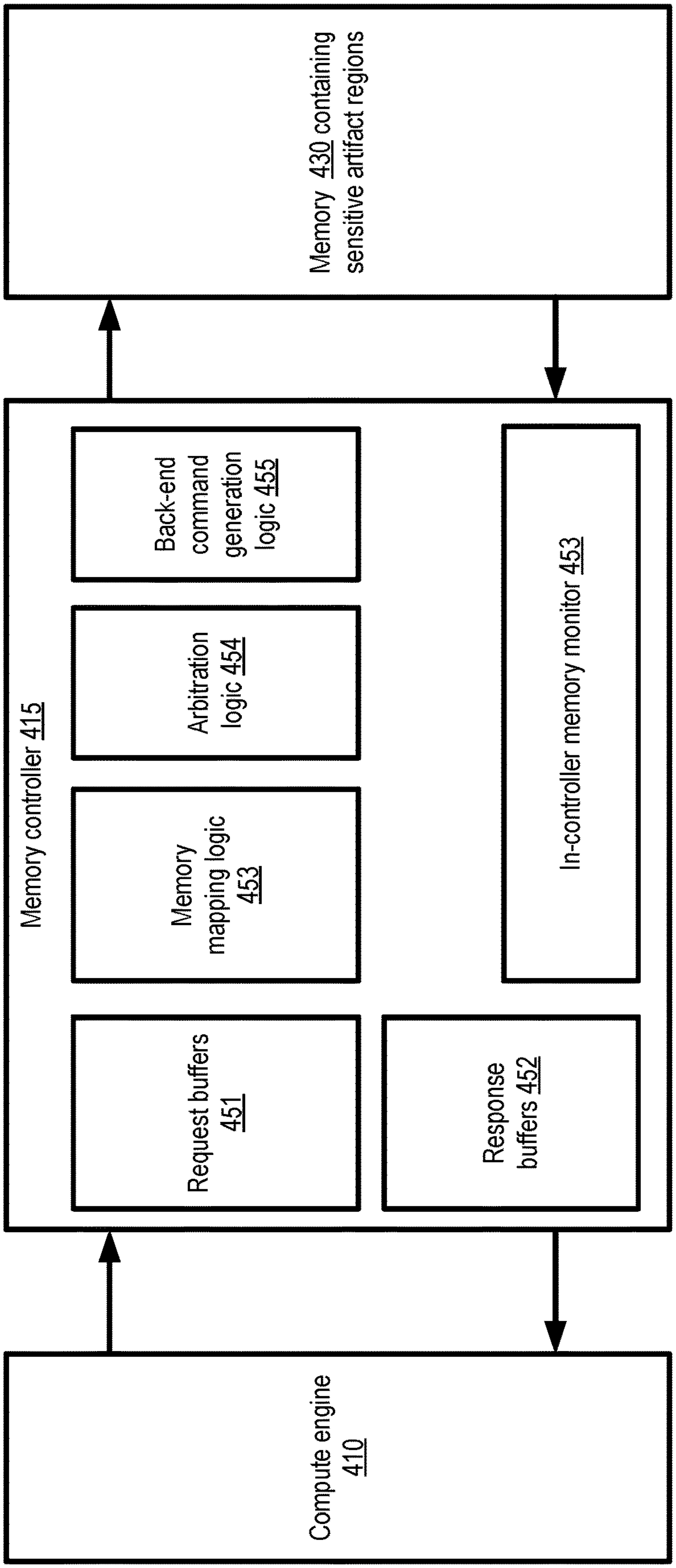
FIG. 4 illustrates an example memory monitor implemented within a memory controller, according to at least some embodiments.

FIG. 4 illustrates an example memory monitor implemented within a memory controller, according to at least some embodiments. A memory controller 415 may act as an intermediary between a compute engine 410 and a memory 430 containing sensitive artifact regions of the kind discussed earlier. At a high level, the memory controller 415 may be responsible for receiving memory access requests from the compute engine, determining the commands to be issued to the memory 430 to fulfill the requests, obtaining an indication of the status of command completion (in the case of writes) or the requested data/code (in the case of reads) and providing the status or data/code to the compute engine 410.

In the depicted embodiment, memory controller 415 may include respective portions of circuitry implementing one or more request buffers 451, memory mapping logic 453, arbitration logic 454, back-end command generation logic 455, response buffers 452 and an in-controller memory monitor 453 (similar in features and functionality to memory monitor 120 of FIG. 1). Access requests received from the compute engine 410 may be stored temporarily in request buffers 451. Memory mapping logic 453 may be used to translate the memory addresses indicated in the requests (which may be expressed using a memory device type-independent format) into device-specific addresses at the back-end memory 430. For example, in at least one embodiment in which SDRAM (synchronous dynamic random access memory) is used for the memory 430, the device-specific addresses may include memory bank, row and column identifiers. The arbitration logic 454 may be responsible for determining the order in which buffered access requests are to be fulfilled in the depicted embodiment, e.g., based on requirements such as speed, fairness, predictability, high memory efficiency, and the like. The back-end command generation logic 455 may identify the specific commands (which may be specific to the generation or technology version being used at the memory 430) to be issued to fulfill a given request from the compute engine. For example, a combination of one or more activate commands (to activate a row in a particular bank), read commands (to initiate a read burst to an active row), write commands (to initiate a write burst to an active row), pre-charge commands (to close a row in a particular bank), and/or refresh commands (to start a refresh of the memory 430) may be used to respond to a request in an implementation in which SDRAM is used. The response buffers 452 may be used to store responses (e.g., read contents) received from the memory 430 in the depicted embodiment.

In the embodiment depicted in FIG. 4, the in-controller memory monitor 453 may be able to determine whether a mitigation action should be initiated (e.g., if a security rule has been violated) with respect to an access request from the compute engine, before the access request is actually fulfilled. For example, memory access requests may be examined by the monitor 453 for possible violations while they are in request buffers, or by accessing the output of memory mapping logic 453 from the monitor 453. Such a memory monitor may also be referred to as an in-line or in-band memory monitor, as the memory access requests are monitored or examined along the path between the compute engine 410 and the memory 430. The memory monitor 453 shown in FIG. 4 may include sensitive region descriptor registers, access detection circuitry, rule evaluation circuitry and mitigation action initiation circuitry similar to the elements of monitor 120 of FIG. 1.

Example Out-of-Controller Memory Monitor

Figure 5:
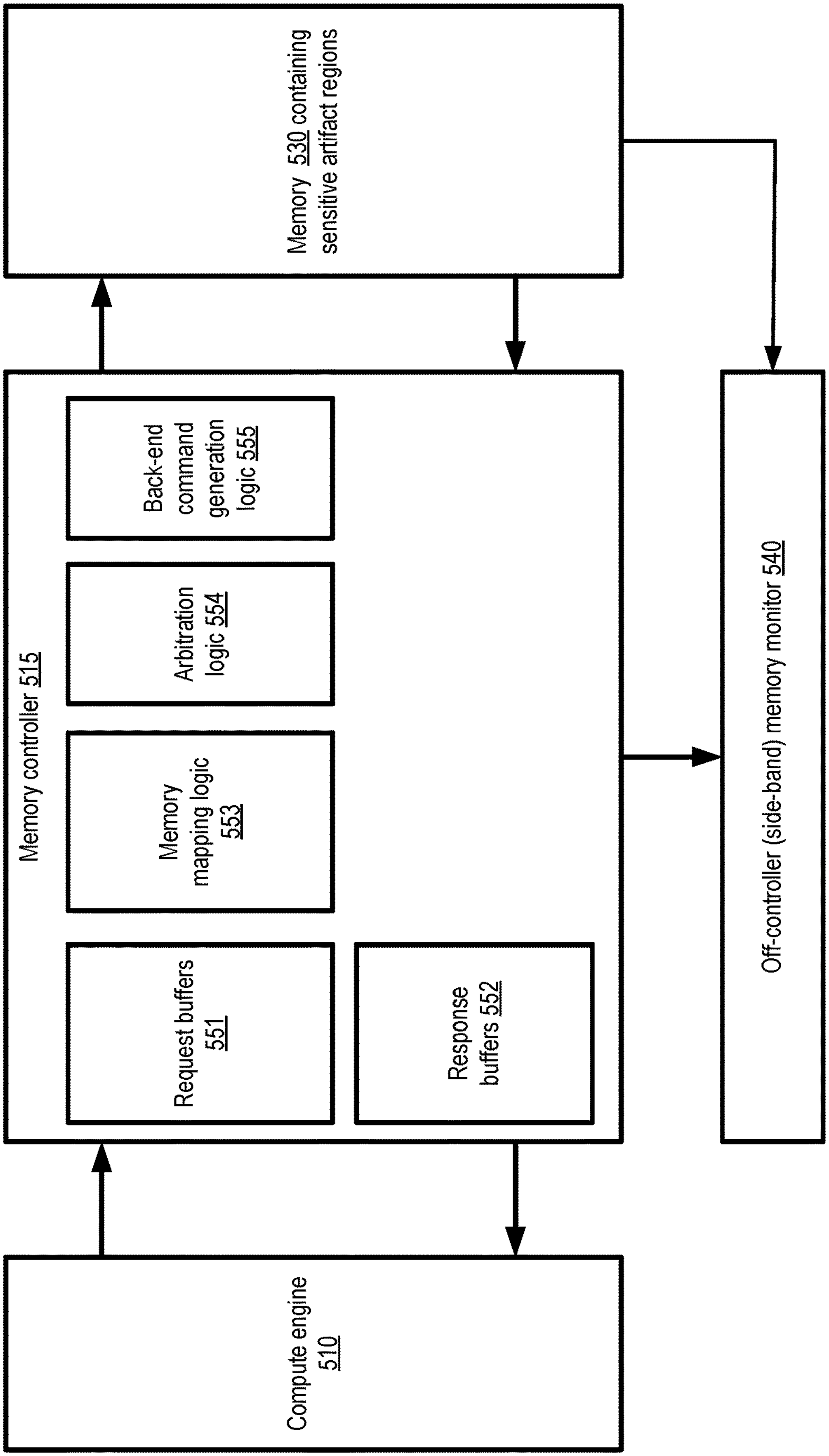
FIG. 5 illustrates an example sideband memory monitor which may be implemented in circuitry external to a memory controller, according to at least some embodiments.

In some embodiments, an alternative to the approach illustrated in FIG. 4 may be used to monitor accesses to sensitive regions of memory. FIG. 5 illustrates an example sideband memory monitor which may be implemented in circuitry external to a memory controller, according to at least some embodiments. As in FIG. 4, a memory controller 515 may act as an intermediary between a compute engine and a memory 530 comprising one or more regions with sensitive data or code. Memory controller 515 may include request buffers 551, memory mapping logic 553, arbitration logic 554, back-end command generation logic 555 and response buffers 552, which perform similar functions as the analogous components shown in FIG. 4. However, in the embodiment depicted in FIG. 5, the hardware memory monitor 540 may not be included as a component of the memory controller 515. Instead, the monitor 540 may be implemented using circuitry at a separate chip or card than is used for the memory controller; such hardware memory monitors may be referred to as off-controller monitors. In one embodiment, the monitor 540 may be implemented at a card connected to the compute engine 510 and the memory 530 via a peripheral interconnect (e.g., a PCI or PCIe interconnect or bus). Such cards may be inaccessible from un-trusted code running on the primary CPUs of the computing system in at least some embodiments, so it may not be possible to tamper with the sensitive region descriptors of the memory monitors of the card after they have been populated.

In the configuration depicted in FIG. 5, the off-controller memory monitor 540 is not part of the pathway between the compute engine 510 and the memory 530. As such, such off-controller memory monitors may also be referred to as side-band memory monitors. In order to be able to detect memory accesses to which security rules that require mitigation actions apply, side-band memory monitor 540 may use a variety of techniques in different embodiments. In one embodiment, side-band memory monitor may periodically check whether the contents of one or more sensitive artifact regions have changed—e.g., by generating a hash value from the current contents and comparing the current hash value with a hash value generated during the initialization phase of the computing system, or by comparing the current contents with a saved replicated version of the contents. Depending on the scheduling of such checks, this comparison-based approach may enable the side-band memory monitor 540 to detect undesired writes to sensitive artifact regions very shortly after the writes have been applied in various embodiments. In one implementation, the side-band memory controller 553 may also or instead receive representations of access requests or transactions (for reads and/or writes) from the memory controller 515. Such representations may in some implementations be received before the memory accesses are initiated, and thus may be used to prevent memory accesses that could violate security rules. In other implementations, a representation of a memory access request or transactions may be received after the memory access is completed. The side-band approach illustrated in FIG. 5 may have the advantage over the in-controller approach of FIG. 4 in that minimal changes may be required in the hardware used for the primary pathway between the compute engine 510 and the memory 530 in the side-band approach. However, in at least some embodiments, the side-band approach may have the disadvantage that it may take slightly longer to detect security rule violations, and/or fewer types of security rule violations may be detectable than when in-controller memory monitors are used.

Example Elements of a Sensitive Artifact Descriptor

Figure 6:
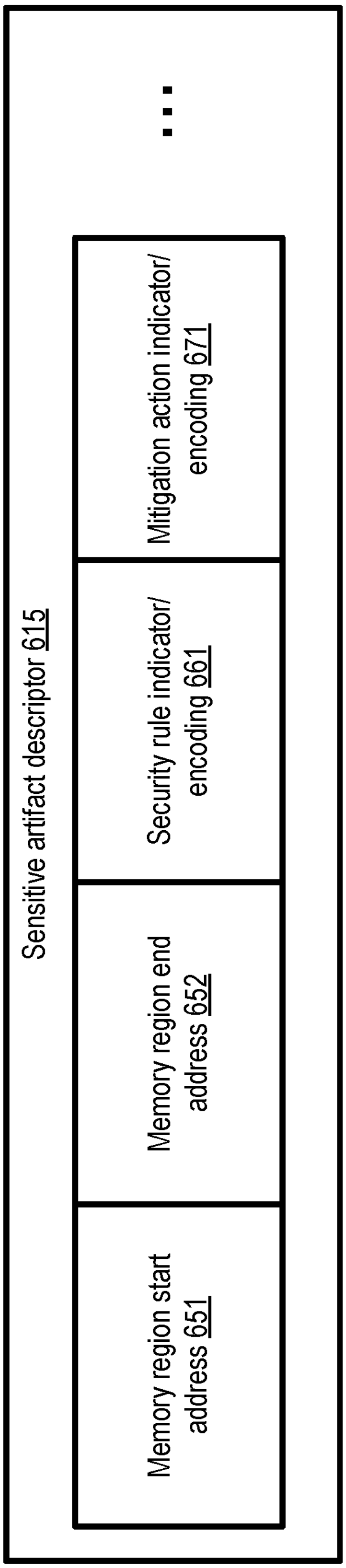
FIG. 6 illustrates example elements of a sensitive artifact descriptor, according to at least some embodiments.

FIG. 6 illustrates example elements of a sensitive artifact descriptor, according to at least some embodiments. In the depicted embodiment, a sensitive artifact descriptor 615 may comprise a start address 651 of a memory region into which data or code to be protected using the hardware memory monitor has been stored, as well as an end address 652 of the region. In some implementations, the end address may not be stored in the descriptor; instead, an indication of the size of the memory region may be stored, which may be used in conjunction with the start address to determine whether a target address of a memory access is part of the region.

In some embodiments, an indicator or encoding 661 of the security rule(s) applicable to the memory region may be included in the descriptor 615. Any of several different types of rules may apply to a given memory region, and respective encodings (e.g., a binary encoding of length b bytes, where b is the number of rule types) may be stored for each region. A security rule may indicate, for example, that the region is designated read-only, so a write directed to the region represents a rule violation. Another example security rule may indicate that writes are permitted, but that a notification or alarm indicating that the write has been requested and/or performed is to be generated. In some embodiments, a security rule may indicate that any memory access to the region is to be reported or logged, even if the requested type of access is permitted—e.g., even reads to a read-only region may be logged or reported via a notification mechanism. According to another security rule, an access of a particular type may be deferred or delayed until it is approved—e.g., the computing system may be paused temporarily until approval of the memory access is obtained via a programmatic interface. An encoding 671 of the mitigation action(s) to be initiated or caused by the hardware memory monitor in response to a detection of an access to which a security rule applies may be stored within the sensitive artifact descriptor in at least some embodiments. Example mitigation actions which may be performed in different embodiments are discussed below in further detail in the context of FIG. 7.

Other elements, not shown in FIG. 6, may be included within a sensitive artifact descriptor 615 in some embodiments. For example, in some embodiments, different rules and/or mitigation actions may be stored for a given type of access, based on the permissions granted to the source or requester of the memory access, and an indication of the permissions levels associated with rules may also be stored in the descriptor. In one embodiment, the indications of the security rules and/or the mitigation actions may be stored separately from the start and end addresses of the memory regions: e.g., one set of registers may be used for the address information, and another set of registers may be used for rule and action indicators.

Example Mitigation Actions

Figure 7:
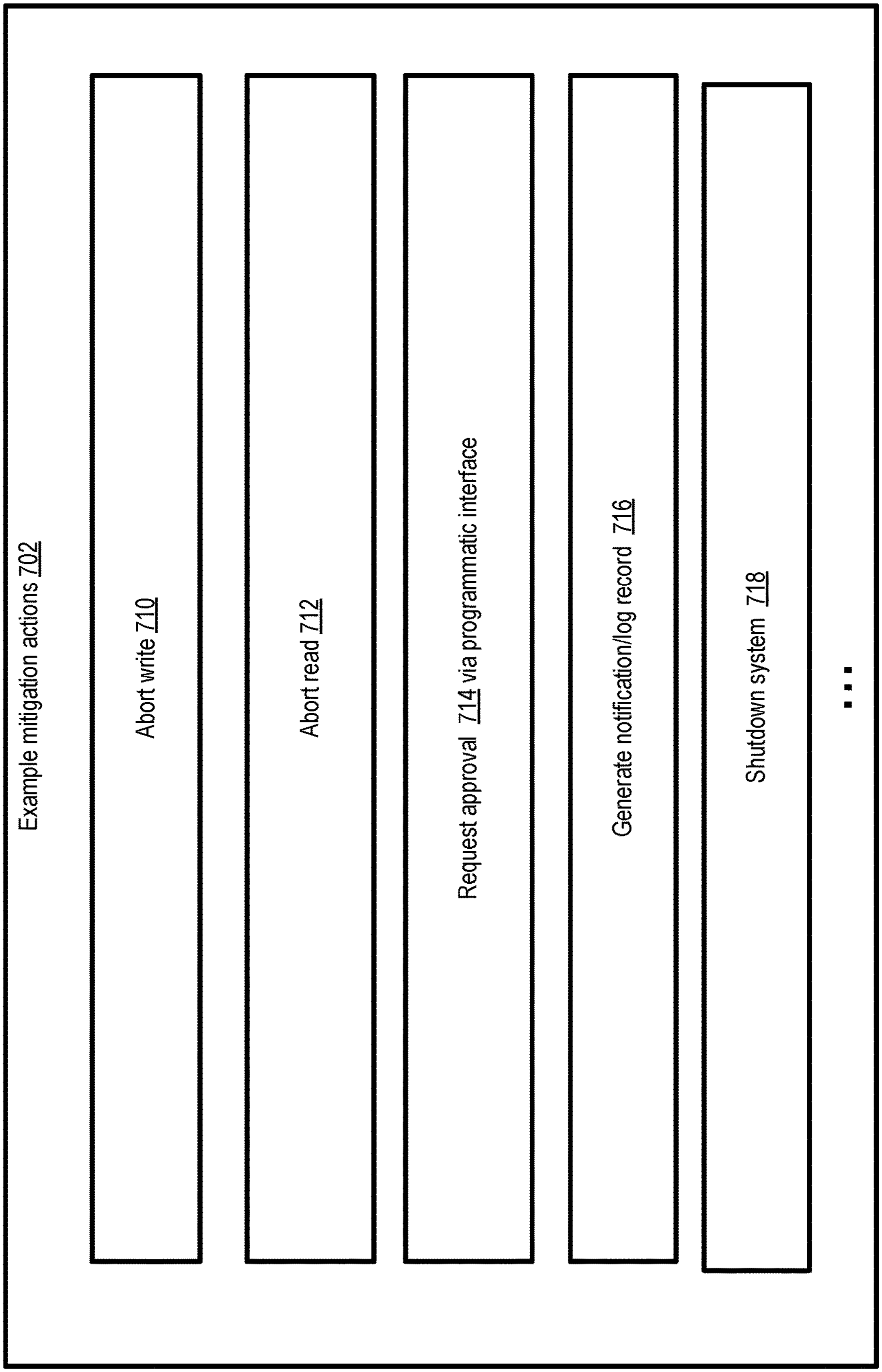
FIG. 7 illustrates example mitigation actions which may be initiated in response to a detection, by a hardware memory monitor, of a memory access with an associated security rule, according to at least some embodiments.

FIG. 7 illustrates example mitigation actions which may be initiated in response to a detection, by a hardware memory monitor, of a memory access with an associated security rule, according to at least some embodiments. If, for example, a security rule indicates that a region of memory containing sensitive artifacts is designated as read-only, a mitigation action may abandon or abort the write (element 710). In some cases, a read access request may be aborted (element 712).

In at least some embodiments, the set of mitigation actions 702 initiated with the help of a hardware memory monitor similar to monitor 120 of FIG. 1 may include issuing a request for programmatic approval 714 of an impending memory access which has been suspended or delayed. For example, the hardware memory monitor may send an interrupt to the primary CPUs of the system, and the primary CPUs may in turn execute code which results in a transmission of an alert or alarm to an authorized entity, indicating details of the artifacts to which access is being attempted, the type of access (read and/.or write), the source of the access request, and so on. The access may be deferred or delayed until an approval is received via a programmatic interface from the authorized entity in at least some embodiments. If an approval is not received, in some embodiment the memory access may be abandoned.

Mitigation actions 710 for some types of memory accesses may include generating a notification or log record 716 in the depicted embodiment. Storing such records of accesses to regions of memory containing sensitive artifacts may in some cases be accompanied by one or more other mitigation actions (such as abandoning/aborting the memory access, requesting approval, etc.). In at least one embodiment, the computing system may be shut down (element 718) in response to the detection of an access to a memory region which violates a security rule.

In some embodiments, a conditional approach involving a write access may be taken in a mitigation action 710, combining aspects of obtaining request approval and (potential) rejection or abort of the write. Assume that writes to a particular memory region MR1 of main memory are permitted, but only by certain compute engines or entities, or under certain restricted conditions which require analysis and/or approval by an administration or other authorized entity. A shadow copy SC1 of MR1 may be created in advance of any writes, e.g., using a different memory than the main memory (such as a memory at a peripheral device or system-on-chip. When the hardware memory monitor detects a requested write directed to MR1, it may make the requested modification in MR1, while keeping SC1 unchanged; as part of a corresponding mitigation operation, however, a notification or alarm may be triggered and directed to an authorized entity. From the perspective of the requesting compute engine, the write may appear to have succeeded. If the analysis performed by the authorized entity indicates that the write is not to be permitted, the contents of MR1 may be replaced by the contents of SC1, in effect undoing or rolling back the write. If, in contrast, the write is approved, SC1 may be updated to match the current contents of MR1. In a slightly different implementation, the write may initially be directed at SC1, and only applied to MR1 if approved by the authorized entity. In some implementations, the shadow copy may also be created in the main memory.

Example Programmatic Interactions

Figure 8:
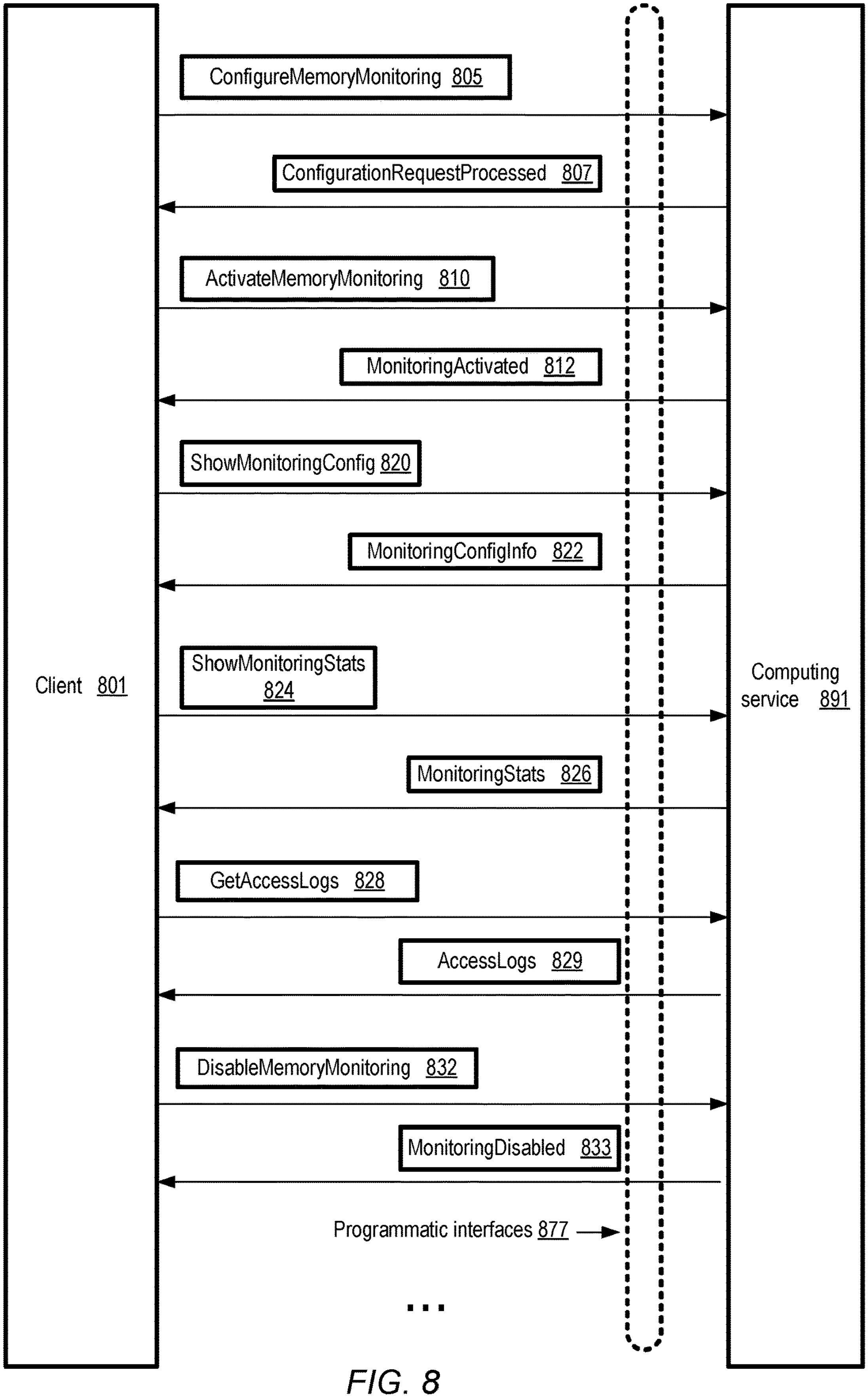
FIG. 8 illustrates example programmatic interactions related to the configuration and use of hardware memory monitors, according to at least some embodiments.

FIG. 8 illustrates example programmatic interactions related to the configuration and use of hardware memory monitors, according to at least some embodiments. In the depicted embodiment, a computing service 891 of a provider network (e.g., a virtualized computing service) may implement a set of programmatic interfaces 877, such as web-based consoles, application programming interfaces, command-line tools, graphical user interfaces and the like, which can be used by clients 801 of the service to submit requests pertaining to memory monitoring.

A ConfigureMemoryMonitoring request 805 may be submitted via programmatic interfaces in the depicted embodiment by a client 801, indicating for example the sets of artifacts (including cryptographic keys, firmware or software programs) for which specified security rules are to be evaluated at one or more computing systems set up for the client at the service, the kinds of mitigation actions to be initiated for the different rules, and so on. The computing service may store an indication of the requested configuration options related to memory monitoring, and transmit a ConfigurationRequestProcessed response message 807 in at least one embodiment. Note that in order for the requested configuration settings to actually be enforced at a given computing device managed by the service 891, the device may have to be restarted or rebooted (e.g., with a new version of initialization software), so the changes requested by the client may only be implemented upon restart.

In at least some embodiments, hardware memory monitoring of the kind introduced herein may be dynamically disabled or enabled, e.g., based on a configuration setting value of a computing system equipped with hardware memory monitors. An ActivateMemoryMonitoring request 810 may be submitted to start monitoring at one or more specified computing systems in the depicted embodiment. In response, the appropriate configuration changes may be made at the targeted computing systems, and a MonitoringActivated response message 812 may be sent to the client. A GetAccessLogs request 828 may be submitted by a client 801 to obtain log records indicating the number and type of accesses from one or more compute engines to one or more monitored regions of memory in some embodiments, and the requested information may be provided in one or more AccessLogs response messages 829. A DisableMemoryMonitoring request 832 may be sent to stop memory monitoring at specified computing systems in the depicted embodiment, and a MonitoringDisabled message 833 may be sent in response. In some embodiments, activating or deactivating hardware memory monitoring may require a reboot or restart of the targeted computing system.

A client 801 may obtain a representation of the current hardware monitoring configuration of a computing system comprising a hardware memory monitor, including the memory regions whose accesses are being monitored, the applicable security rules and/or associated mitigation actions, by submitting a ShowMonitoringConfig request 820 via programmatic interfaces 877 in the depicted embodiment. The requested information may be provided via one or more MonitoringConfigInfo messages 822.

In some embodiments, statistics about the memory accesses directed to the regions for which security rules have been set up may be obtained by submitting a ShowMonitoringStats message 824. Metrics such as the number of allowed or disallowed memory accesses to various protected memory regions during a time interval, the number of times various mitigation actions were initiated during the time interval, and so on, may be provided via one or more MonitoringStats response messages 806.

Note that other types of programmatic interactions associated with hardware memory monitors may be supported in at least some embodiments, and some of the types of requests shown in FIG. 8 may not be supported in at least one embodiment.

Methods for Hardware Memory Monitoring

Figure 9:
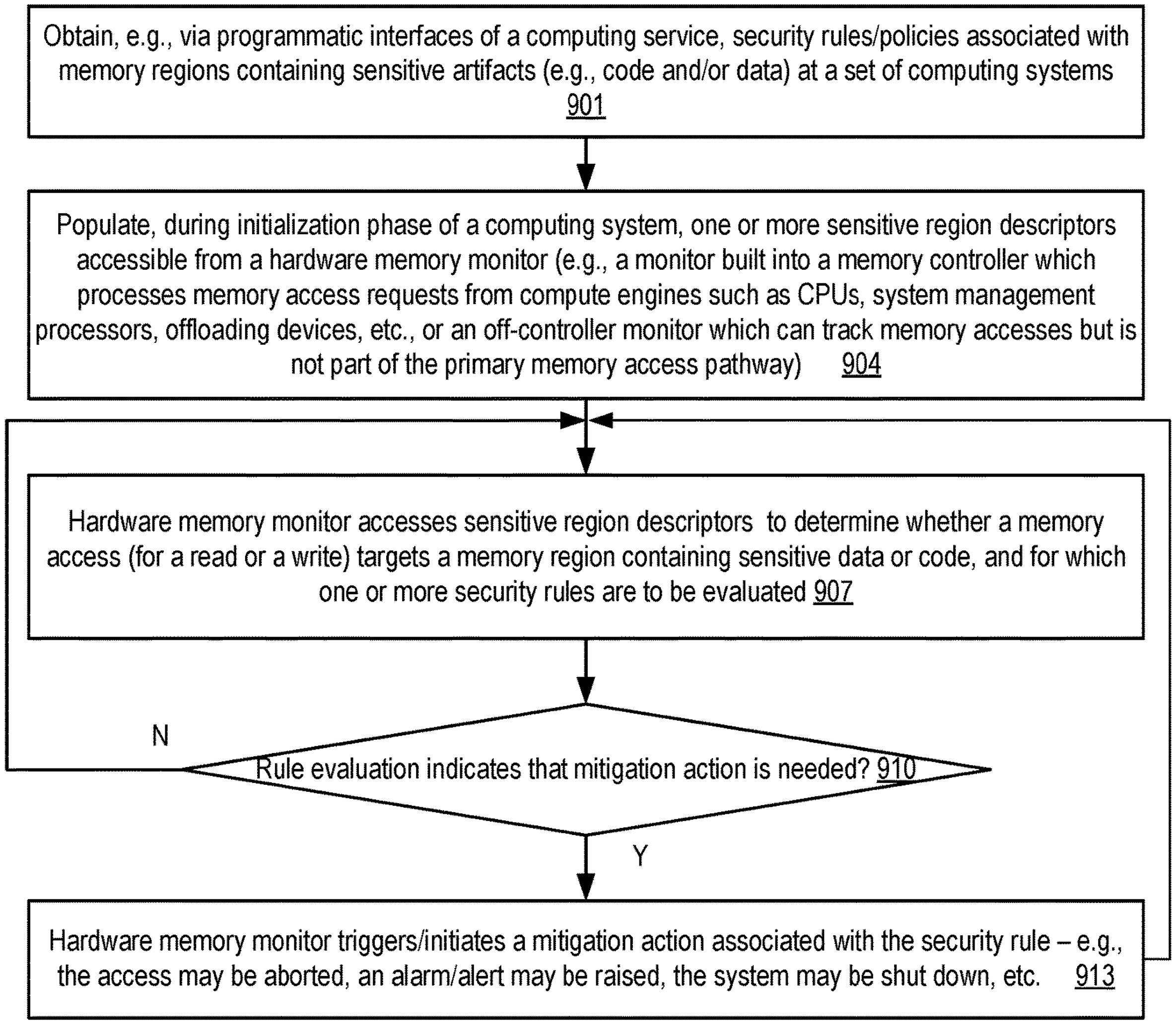
FIG. 9 is a flow diagram illustrating aspects of operations that may be performed to configure and use hardware memory monitors for applying security rules pertaining to memory regions, according to at least some embodiments.

FIG. 9 is a flow diagram illustrating aspects of operations that may be performed to configure and use hardware memory monitors for applying security rules pertaining to memory regions, according to at least some embodiments. As shown in element 901, a set of security rules/policies associated with computing system memory regions containing sensitive artifacts (e.g., code and/or data such as cryptographic keys) may be obtained, e.g., via programmatic interfaces of a computing service.

A set of sensitive region descriptors (e.g., registers accessible from a hardware memory monitor) may be populated at a computing system, e.g., during an initialization phase of the computing system by trusted secure boot code (element 904). Various types of information about the memory regions containing sensitive artifacts may be stored in the descriptors in different embodiments, including for example the start and end locations/addresses of the regions, indications of the security rules and/or the mitigation actions associated with the security rules, and so on. The memory monitor may be built in to a memory controller in some embodiments, with the memory controller responsible for processes memory access requests from compute engines such as CPUs, GPUs, system management processors and the like. In other embodiments, the memory monitor may be external to the memory controller(s) of the computing system. In the latter scenario, the memory monitor may not be part of the memory access pathway between the compute engine and the memory, but may nevertheless be able to track or detect memory accesses of one or more types.

A hardware memory monitor at the computing system may access the information stored in the sensitive region descriptors to determine whether a given memory access (for a read and/or a write) targets one of the memory regions indicated in the descriptors (element 907). If the memory access does target such a region, one or more security rules may be evaluated.

If a result of evaluating the rule indicates that a mitigation action is to be performed (as detected in operations corresponding to element 910), the hardware memory monitor may trigger or initiate the appropriate mitigation action (element 913) associated with the rule. For example, the memory access may be aborted, an alarm or alert may be generated, or the computing system may be shut down in some cases. In some cases, a security rule may not have to be violated for an action to be triggered—e.g., reads to a memory region with an associated rule may be permitted, but a notification or log message may be generated for each read based on the associated rule in one embodiment. If no mitigation action is required, the hardware memory monitor may wait until the next memory access is requested, and then perform operations corresponding to elements 907, 910 and 913 for that next memory access in the depicted embodiment.

It is noted that in various embodiments, some of the operations shown in FIG. 9 may be implemented in a different order than that shown in the figure, or may be performed in parallel rather than sequentially. Additionally, some of the operations shown in FIG. 9 may not be required in one or more implementations.

Use Cases

The techniques described above, of configuring and using low-level hardware for monitoring accesses to regions of memory containing security-sensitive data or code, and for quickly initiating mitigation actions when security rule violations are detected, may be beneficial in a variety of scenarios. Attackers are constantly devising more and more sophisticated techniques to breach computer system security. In general, regardless of specific hardware or software architectures, a typical computing system stack includes multiple layers, with hardware at the lowest layer and various layers of firmware and software running on top of the hardware. Often some of the lower layers are transparent to users of the computer systems—that is, even though the lower layers may be utilized to perform various operations on behalf of the users, the users themselves may be largely unaware of such operations. Security compromises of such low layers of the system could thus potentially remain unnoticed for long periods, with numerous successive or concurrent users implicitly trusting the system's stack. Especially in environments (such as cloud computing systems) in which programs are run on behalf of multiple users at a given server or host, providing the ability to very quickly detect potential attacks at the hardware level may prevent business critical operations from being disrupted. Furthermore, providing information to administrators about inadvertent accesses directed to sensitive artifacts may also help identify and fix bugs in software and firmware which could otherwise potentially provide avenues for attacks.

Illustrative Computer System

Figure 10:
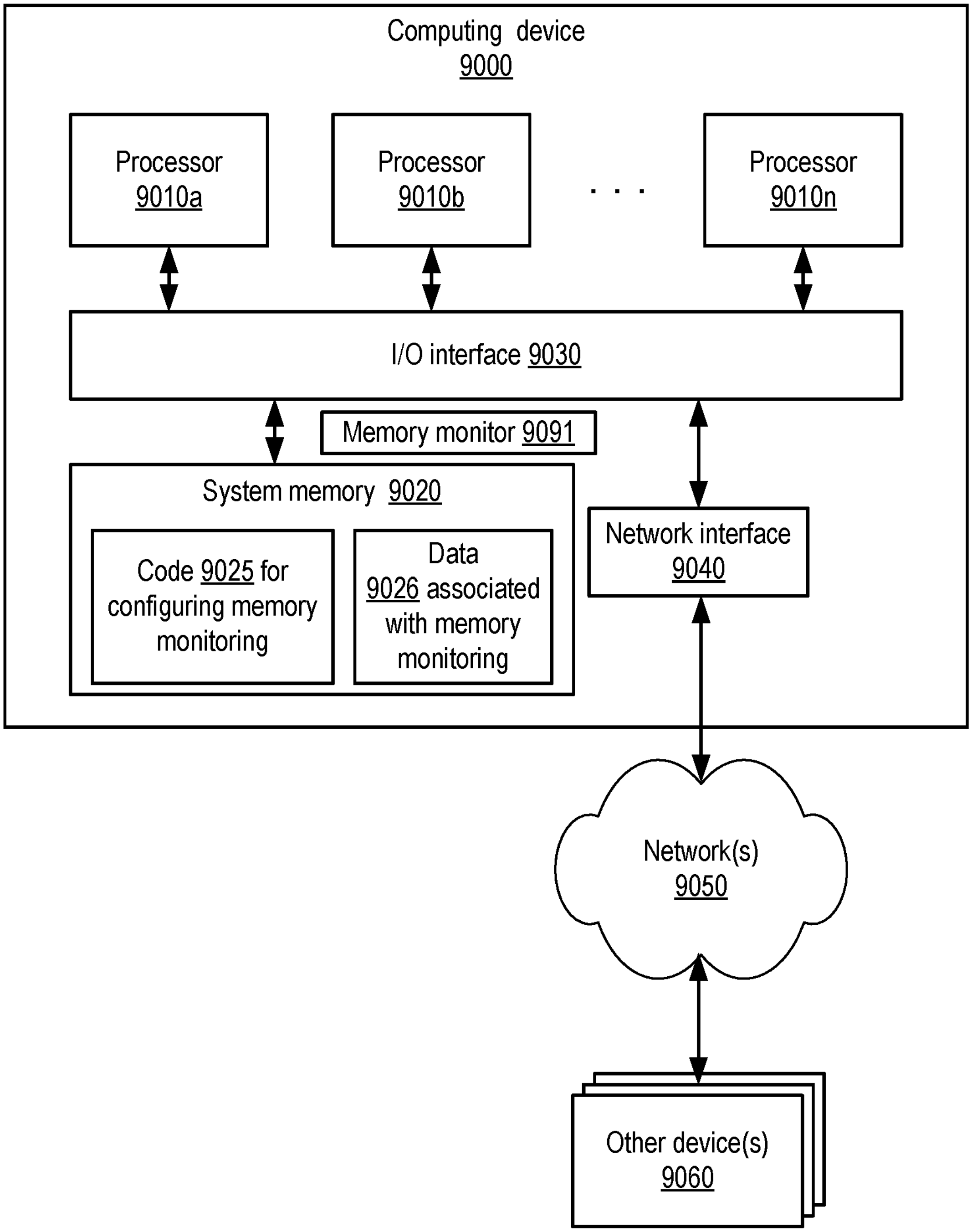
FIG. 10 is a block diagram illustrating an example computing device that may be used in at least some embodiments.

In at least some embodiments, a server at which memory monitoring techniques of the kind described herein are implemented and/or at which software or firmware for configuring such memory monitoring is developed and/or executed, may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030, and a hardware memory monitor 9091 similar in features and functionality to memory monitor 120 of FIG. 1.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026. Code 9025 may include, for example, instructions usable to set configuration settings for memory monitoring, populating the sensitive region registers accessed by the memory monitor 9091, and so on. A subset of data 9026 may similarly pertain to aspects of memory monitoring.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:

a memory monitor implemented in hardware and incorporated within a memory controller that receives memory access requests from a compute engine distinct from the memory controller;

wherein the memory monitor comprises hardware circuitry is distinct from the compute engine and is configured in hardware to:

detect that a target memory location of a memory access requested from the compute engine of the system is part of a particular region indicated in one or more sensitive region registers, wherein the particular region comprises one or more elements of firmware to which at least a first security rule applies;

evaluate the first security rule with respect to the memory access; and based at least in part on a result of evaluating the first security rule, initiate one or more mitigation operations.

2. The system as recited in claim 1, further comprising one or more compute engines including the compute engine, and one or more memories, wherein the one or more memories comprise executable instructions that when executed on or across the one or more compute engines store, within the one or more sensitive region registers during an initialization phase of the system, at least a start location and an end location of a respective memory region within the one or more memories, wherein a respective security rule applies to contents of individual ones of the respective memory regions, and wherein, after the one or more sensitive region registers have been populated during the initialization phase, contents of the one or more sensitive region registers are not modifiable until a restart of the system, wherein the one or more memories comprise further executable instructions that when executed on or across the one or more compute engines:

store, within a sensitive region register of the one or more sensitive region registers, an indication of one or more of: (a) the first security rule or (b) the one or more mitigation operations.

3. The system as recited in claim 1, wherein the memory monitor is incorporated within a peripheral card.

4. The system as recited in claim 1, wherein the memory access requested from the compute engine is a read access.

5. A method, comprising:

detecting, by a hardware memory monitor of a computing system using one or more sensitive region descriptors, that at least a first security rule applies to a target memory location of a memory access requested from a compute engine of the computing system, the hardware memory monitor implemented in hardware circuitry distinct from the compute engine;

determining, by the hardware memory monitor, that one or more mitigation operations associated with at least the first security rule are to be performed; and initiating, by the hardware memory monitor, the one or more mitigation operations.

6. The method as recited in claim 5, further comprising:

populating, during an initialization phase of the computing system, the one or more sensitive region descriptors, wherein individual ones of the one or more sensitive region descriptors indicate at least a start location and an end location of a respective memory region, and wherein a respective security rule applies to contents of individual ones of the respective memory regions.

7. The method as recited in claim 5, further comprising: obtaining an indication, after an initialization phase of the computing system has completed, that a size or a location of a memory region indicated in the one or more sensitive region descriptors has changed.

8. The method as recited in claim 5, wherein the hardware memory monitor is incorporated within a memory controller configured implement the memory access in response to a request from the compute engine.

9. The method as recited in claim 5, further comprising: populating at least one sensitive region descriptor of the one or more sensitive region descriptors using one or more of: (a) a machine learning model or (b) a knowledge base.

10. The method as recited in claim 5, wherein the compute engine comprises one or more of: (a) a central processing unit (CPU), (b) a graphics processing unit (GPU), (c) a systems management processor of the computing system, (d) a processor on a peripheral card of the computing system, (e) an application specific integrated circuit (ASIC), (f) a field programmable gate array (FPGA), or (g) a complex programmable logic device (CPLD).

11. The method as recited in claim 5, further comprising: obtaining, via a programmatic interface, an indication of a memory region which includes the target memory location.

12. The method as recited in claim 5, further comprising: obtaining, via a programmatic interface, an indication of the one or more mitigation operations.

13. The method as recited in claim 5, wherein the one or more mitigation operations include one or more of: (a) aborting the memory access, (b) delaying the memory access, or (c) generating a notification.

14. The method as recited in claim 5, wherein the target memory location comprises at least a portion of one or more of: (a) a firmware program, (b) a security artifact, (c) a cryptographic key, or (d) application code of an application.

15. A device, comprising:

memory monitor hardware circuitry configured in hardware to:

access one or more sensitive region descriptors to detect that a security rule applies to a target memory location of a memory access requested from a compute engine distinct from the memory monitor hardware circuitry;

determine that one or more mitigation operations associated with the security rule are to be performed; and initiate the one or more mitigation operations.

16. The device as recited in claim 15, wherein the memory access is a write access.

17. The device as recited in claim 15, wherein the one or more sensitive region descriptors are accessed after the memory access has been completed.

18. The device as recited in claim 15, wherein the one or more sensitive region descriptors include an indication of one or more of: (a) the security rule or (b) the one or more mitigation operations.

19. The device as recited in claim 15, wherein the compute engine comprises one or more of: (a) a central processing unit (CPU), (b) a graphics processing unit (GPU), (c) a systems management processor, (d) a processor on a peripheral card of a computing system, (e) an application specific integrated circuit (ASIC), (f) a field programmable gate array (FPGA), or (g) a complex programmable logic device (CPLD).

* * * * *